United States Patent [19]

Miyazaki et al.

[11] Patent Number: 4,984,891
[45] Date of Patent: Jan. 15, 1991

[54] LASER GAUGE INTERFEROMETER AND LOCATING METHOD USING THE SAME

[75] Inventors: Chuuichi Miyazaki, Tsukuba; Toshio Akatsu, Ushiku; Sadao Mori, Ibaraki, all of Japan

[73] Assignee: Hitachi, Ltd., Tokyo, Japan

[21] Appl. No.: 304,653

[22] Filed: Feb. 1, 1989

[30] Foreign Application Priority Data

Feb. 8, 1988 [JP] Japan .................................. 63-27025
Jun. 11, 1988 [JP] Japan .................................. 63-144183

[51] Int. Cl.$^5$ ............................................. G01B 9/02
[52] U.S. Cl. ...................................... 356/358; 356/363
[58] Field of Search ................................ 356/358, 363

[56] References Cited

U.S. PATENT DOCUMENTS 4,215,938 8/1980 Farrand et al. ...................... 356/358
4,765,741 8/1988 Detro et al. ......................... 356/358
4,813,783 3/1989 Torge .................................. 356/358

FOREIGN PATENT DOCUMENTS 263801 12/1985 Japan .

*Primary Examiner*—Davis L. Willis
*Assistant Examiner*—Matthew W. Koren
*Attorney, Agent, or Firm*—Fay, Sharpe, Beall, Fagan, Minnich & McKee

[57] ABSTRACT

A positional measuring laser interferometer splits a laser beam into a measuring beam and a correcting beam. Each of these beams is further split into a measurement beam and a reference beam. The reference beams travel along a fixed length path of fixed optical properties. Each of the measurement beams travels along respective optical paths in air adjacent each other so that they travel in air having substantially the same changing optical properties, such as the fraction index, preferably with the paths differing in length by a fixed amount regardless of the movement of the object to be measured. The reference beam and measurement beam, for each of the measuring and correcting beams, form an interference pattern that is detected to produce respective outputs correlated to positional information of the object and subjected to positional error due to changing refraction index of air. These two information signals are combined, preferably with a reference refraction index and a reference object position, to obtain a positional information signal of the object that is independent of varying optical characteristics of air. The solid/air interface surface for the interferometer, with respect to the measurement beams, is fixed in position independently of thermal or like expansion of the interferometer by an adjacent abutment surface spring biased into a fixed base abutment surface, which abutment surfaces are generally coplanar with the solid/air interface surface and perpendicular to the path of the measurement beams in air.

18 Claims, 7 Drawing Sheets

LASER GAUGE INTERFEROMETER AND LOCATING METHOD USING THE SAME

BACKGROUND OF THE INVENTION

This invention relates to a laser gauge interferometer which improves accuracy of measurement. This laser gauge interferometer can be used, for example, for improving locating accuracy of wafers in a semiconductor fabrication apparatus.

In a conventional laser gauge interferometer, the measurement error of displacement due to the change of the refractive index of air has been corrected in the following manner, as described in Japanese Patent Laid-Open No. 263801/1985. A reference beam as a beam for correcting the refractive index is disposed in the proximity of a signal beam separately from the signal beam and a reference beam reflecting mirror and a signal beam reflecting mirror are disposed in the spaced-apart relation by substantially the same distance. Since both beams are affected substantially equally by the change of the refractive index, the influences can be cancelled by taking the interference between booth beams and correction is thus made approximately. However, the prior art technique does not consider the measurement error occurring when the object of measurement moves in a certain large distance and the difference of the optical path lengths of both beams becomes great.

The prior art technique that has been most widely employed at present measures the temperature, pressure, humidity, etc., in the proximity of the signal beam by use of an environmental sensor and calculates the refractive index of air by numeric formulas to make numeric correction. However, since the number of measuring points in the environment is limited, correction can be made only on the average of the refractive index at the number of measuring points and is not complete as the correction covering the laser beam path as a whole.

As described above, in accordance with the prior art technique, correction becomes incomplete when the object of measurement undergoes displacement and the difference of the optical path lengths between the reference beam and the signal beam becomes great because the degree of influences of the change of the refractive index of air on both of these beams is different. Accordingly, the measurement error tends to become great.

SUMMARY

It is therefore an object of the present invention to provide a laser gauge interferometer which makes complete correction at whichever position the object of the measurement is situated and in whichever way the refractive index of air is distributed on the beam, and which can thus reduce the measurement error.

The object described above can be accomplished by the laser gauge interferometer wherein a beam for correcting the refractive index, its signal processing circuit and its operational unit that are completely independent of those of a beam for measuring the displacement of the object of measurement are disposed, the correction beam indirectly monitors the change of the refractive index of air, the components resulting from the change of the refractive index of air are eliminated from the results of measurement by both beams and the output completely free from the influences is calculated and outputted from the operational unit.

Among the two laser beam obtained by slitting a laser beam by beam splitter means, a correcting beam passes in the proximity of the other measuring beam in air and measures the displacement of the object of measurement from a mutually separate aspect. At this time, since the optical paths of both of these beams are very close to each other, it is possible to assume that both of them are affected equally and in accordance with their optical path lengths by the change of the refractive index of air. Therefore, the quantity of displacement of the object of measurement free from the influences of the change of the refractive index of air can be measured by the calculation which uses the measurement outputs of both of these beams.

BRIEF DESCRIPTION OF THE DRAWING

Further objects, features and advantages of the present invention will become more clear from the following detailed description of an embodiment of the present invention, shown in the accompanying drawing, wherein.

DETAILED DESCRIPTION OF A PREFERRED EMBODIMENT

Figure 1A:
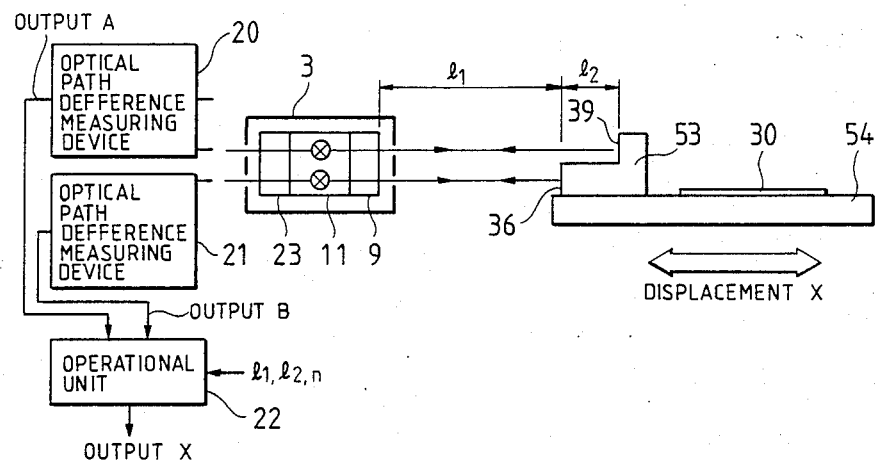
FIG. 1(a) is a side elevational view showing a schematic overall construction of the laser gauge interferometer in accordance with the present invention.
Figure 1B:
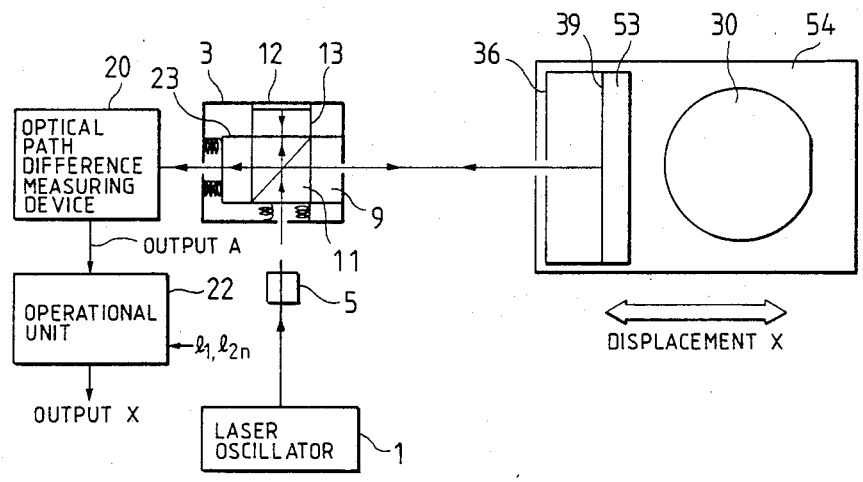
FIG. 1(b) is a top plan view of the interferometer shown in FIG. 1(a)
Figure 2:
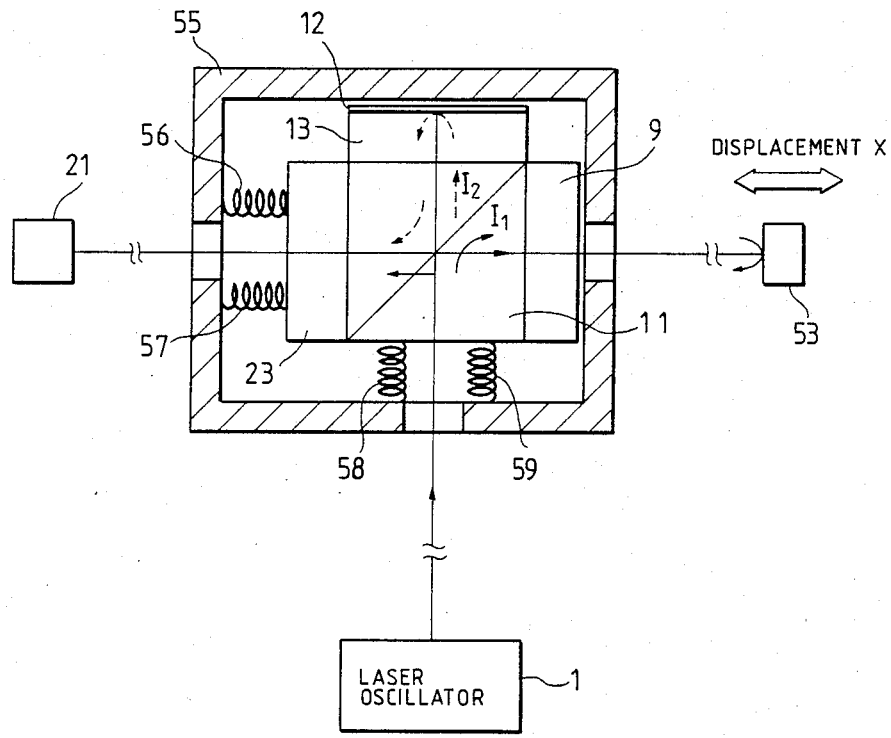
FIG. 2 is an enlarged view of the interferometer portion of the apparatus of FIG. 1.

Hereinafter, a laser gauge interferometer in accordance with one embodiment of the present invention will be described with reference to FIGS. 1 and 2. FIG. 1(a) is a side view, FIG. 1(b) is a plan view and FIG. 2 is partial detailed view. First of all, the overall construction will be explained. Reference numeral 1 denotes a wavelength stabilization laser oscillator for oscillating linearly polarized light and 5 is a beam divider consisting of a beam splitter (hereinafter called "B.S") and a mirror. The beam divider 5 divides the laser mean from the laser oscillator into two parallel beams. Reference numeral 3 denotes an interferometer consisting of a ¼ wavelength plates 9, 13, a polarization plate 23 and a polarized light beam splitter (hereinafter called "P.B.S.") 11. It is urged to, and held on, a holder 55 by springs 56 to 59 using the ¼ wavelength plates 9 and 13 as the support surface as shown in FIG. 2. Reference numeral 53 represents a rod mirror which has reflection surfaces 36, 39, is fitted onto the object 54 of measurement (e.g. an X-Y stage), has a L-shaped section and is made of a base material having a relatively small linear expansion coefficient such as quartz. With the interferometer used in semiconductor fabrication apparatus, a wafer 30 is located on the X-Y stage, which is the object 54 of measurement.

Reference numerals 20 and 21 represent optical path difference measuring devices for converting photoelectrically the interference beams from the interferometer 3 and measuring each of their change. Their outputs A and B, respectively. Reference numeral 22 represents an operational or arithmetic unit for processing these outputs, and its output is an output X.

Next, the operation will be explained. The laser beam of the linearly polarized light leaves the laser oscillator 1 stabilizing the wavelength and has a polarization plane in a direction at 45° to the surface of the sheet of drawing of FIG. 1(a). The beam is divided into two mutually parallel beams by the beam divider 5 and these beams are incident to the positions with marks ⊗ of P.B.S. 11. The beam incident to the upper half side of P.B.S. 11 and the beam incident to the lower half side of P.B.S. 11 are used for measuring the quantity of displacement of the rod mirror 53 placed on the object 54 of measurement, respectively, but since the reflecting positions are different on the reflection surfaces 36 and 39, the optical path length of the later-appearing signal beam is always different by the difference of the step $l_2$ of the mirror.

First, the beam incident into the upper half side of P.B.S. 11 is a measuring beam and is split into two beams by the polarization component on the split surface of P.B.S. 11. The linearly polarized beam having the polarization surface in a direction parallel to the incidence surface reaches the ¼ wavelength plate 13 through the split surface, is then reflected by a reflection film 12 disposed on the back of the ¼ wavelength plate 13 and returns again to P.B.S. 11. Since the polarization surface of the beam that has thus reciprocated through the ¼ wavelength plate 13 is rotated by 90°, the beam is reflected at this time by the split surface of P.B.S. 11 and reaches the polarization plate 23. This beam will be referred to as a "reference beam" (represented by $I_2$ and dashed arrows in FIG. 2) of the measuring beam. On the other hand, the linear polarization component which has first the polarization plane in a direction perpendicular to the incident surface is reflected on the split plane, passes through the ¼ wavelength plate 9, is reflected by the reflection surface of the mirror 53 placed on the object of measurement, passes again through the ¼ wavelength plate 9 and returns to P.B.S. 11. This beam that has once reciprocated through the ¼ wavelength plate 9 has the polarization plane which is rotated by 90°. Therefore, it passes through the split plane of P.B.S. 11 this time and reaches the polarization plate 23. This beam will be referred to as a "signal beam" shown with full line arrows in FIG. 2, (represented by $I_1$) of the measuring beam. Since the axis of transmission of the polarization plate 23 is positioned at 45° to the surface of the sheet of drawing, the common polarization components of both beams $I_1$ and $I_2$ cause mutual interference. When the object of measurement 54 undergoes displacement and the distance between the interferometer 3 and the rod mirror 53 changes, brightness of the interference beam changes. Accordingly, the optical path measuring device 20 obtains the change of the difference of the optical path lengths from this change as the output A.

Next, the beam incident to the lower half of P.B.S. 11 is the correcting beam or beam for correction. In the same way as described above, it is divided into the signal beam ( the signal beam of the correcting beam, which is represented by $I_3$) and the reference beam (the reference beam of the correcting beam, which is represented by $I_4$) and the displacement of the rod mirror 53 is measured by their interference. Since the behaviour of each beam is exactly the same as that of the measuring beam except that the reflecting position of the signal beam changes to the reflection surface 36 and the length of the signal beam is always different by the difference of the step of the mirror, i.e. $l_2$, in comparison with the above-mentioned case, the detailed description will be hereby omitted. The interference beam by this beam is converted to the change of the difference of the optical path lengths in the optical path difference measuring device 20 and is obtained as the output B.

Next, the outputs A and B will be explained. It will be hereby assumed that the distance between the reflection surface 36 and the ¼ wavelength plate 9 at the origin of measurement (at the time of reset) or in other words, when the displacement x of the object 54 of measurement is $l_1$, and it is further assumed that the step difference between the reflection surface 36 and 39 is $l_2$ and the refractive index of air is uniform and is n in the regions of $l_1$ and $l_2$. It will be further assumed that the object 54 of measurement undergoes displacement by x from this state and the refractive index of air changes uniformly by $\Delta n$ on the entire optical path in the interim to $(n+\Delta n)$. Then, the outputs A and B of the optical path difference measuring devices are given by the following equations (1) and (2):

$$A = (l_1+x)(n+\Delta n) - l_1 n$$
$$= x\,n + (l_1+x)\Delta n \qquad (1)$$

$$B = (l_1+l_2+x)(n+\Delta n) - (l_1+l_2)n$$
$$= x\,n + (l_1+l_2+x)\Delta n \qquad (2)$$

Here, when the difference (2)−(1) is calculated, $$B - A = l_2 \Delta n,$$

$$\Delta n = (B-a)/l_2$$

When this is put into equation (1) to obtain x, $$x = \frac{(B-A)l_1 - l_2 A}{l_2 n + B - A} \qquad (3)$$

Therefore, if the values $l_1, l_2, n$ at the time of reset are inputted to the operational unit 22 as the initial values, the equation (3) is calculated by applying the outputs A and B of the optical path difference measuring devices 20 and 21 to the operational unit 22, whenever necessary, and its solution x is outputted as the output X, whenever necessary, the output X becomes the result of measurement of the stable displacement which is not affected by the change of refractive index of air, i.e., $\Delta n$, or in other words, by the influence of fluctuation of air.

Now, accuracy required for $l_1, l_2, n$ at the time of reset that are used as the initial values will be examined.

First of all, if $l_1$ has an error $\delta l_1$, the measurement error arising from this error is given as follows:

$$\delta x = \frac{(B-A)(l_1 - \delta l_1) - l_2 A}{l_2 n + B - A} - \frac{(B-A)l_1 - l_2 A}{l_2 n + B - A}$$

$$= \frac{\delta l_1 (B-A)}{l_2 n + B - A}$$

Assuming that $l_2 N >> (B-A) = l_2 \Delta n$ and the temperature changes by 1° C. on the optical path which is 1 m long by go-and-return, then $\Delta n$ changes by about $10^{-6}$. Therefore, if $\Delta n \approx 10^{-6}$, $$\delta x \approx {}_1 l_2 \Delta n / l_2 \delta l_1$$

$$\approx 10^{-6} \delta l_1$$

Therefore, in order to measure the measurement value x with an error 1 nm, $$10^{-5} \delta l_1 < 10^{-9}$$

$$\therefore \delta l_1 < 10^{-3} \text{ (m)}$$

Accordingly, $l_1$ may be measured with accuracy of 1 mm.

Next, if $l_2$ has an error $\delta l_2$, the measurement error resulting from this error is given as follows:

$$\delta x = \frac{(B-A)l_1 - (l_2 + \delta l_2)A}{(l_2 + \delta l_2)n + B - A} - \frac{(B-A)l_1 - l_2 A}{l_2 n + B - A}$$

$$\approx \frac{-\delta l_2 A(l_2 n + B - A) - \delta l_2 n\{(B-A)l_1 - l_2 A\}}{(l_2 n + B - A)^2}$$

$$\approx \frac{-\delta l_2 (B-A) l_1}{l_2^2}$$

$$= -\frac{l_1}{l_2} \Delta n \cdot \delta l_2$$

Here, if $l_1/l_2 < 10$ and $\Delta n < 10^{-6}$, the following condition must be satisfied in order to keep the measurement error $\delta x$ below 1 nm.

$$-10 \times 10^{-6} \delta l_2 < 10^{-9}$$

$$\therefore \delta l_2 < 10^{-4} \text{ (m)}$$

Therefore, the step $l_2$ of the rod mirror may be produced by machining accuracy of 0.1 mm.

Finally, if n has an error $\delta n$, the measurement error resulting from this error is as follows:

$$\delta x = \frac{(B-A)l_1 - l_2 A}{l_2(n + \delta n) + B - A} - \frac{(B-A)l_1 - l_2 A}{l_2 n + B - A}$$

$$\approx \frac{-l_2 \delta n\{(B-A)l_1 - l_2 A\}}{(l_2 n + B - A)^2}$$

$$\approx \frac{l_2 A - l_1(B-A)}{l_2} \delta n \approx A \cdot \delta n$$

In order to have the measurement error $\delta x$ below 1 nm, accuracy as high as $10^{-8} \sim 10^{-9}$ is required for the initial value n. As can be understood from the fact that equation (3) can be approximately expressed as $$x = A/n,$$

the error of n directly affects the measurement value because the measurement value x is substantially in inverse proportion to the refractive index n. In other words, if there is any error for the initial value n, the scale of the gauge interferometer comes to possess an error and absolute accuracy is not guaranteed. However, repetition accuracy is insured for repeated locating operations used for locating an X-Y stage which is the most ordinary embodiment and will be described later.

If the errors of $l_1$ and $l_2$ are greater than $10^{-3} \sim 10^{-4}$ described above, absolute accuracy drops in proportion to the degree of the errors but repetition accuracy is insured in the same way as in the case of the error of n.

However, if the interferometer is not held on the holder 55 using the outgoing end surface of the signal beam as at least one support surface as shown in FIG. 2, the optical element constituting the interferometer undergoes thermal expansion or contraction an the optical length of the signal beam $I_1$ (the product of the physical length by the refractive index of the medium) changes and the temperature drift of the output occurs. Therefore, a careful attention must be paid.

Though the predetermined optical path length $l_2$ is provided between the signal beam of the measuring beam and the signal beam of the correcting beam by the difference of the positions of the mirror 36 and 39 (the step of the rod mirror 53) as described above, the position of the interferometer of the measuring beam and that of the interferometer of the correcting beam may be deviated by a predetermined distance from each other while the positions of both mirrors 36 and 39 are kept constant. Furthermore, both of these methods may be used in combination. In short, it is necessary to keep a predetermined difference of optical path lengths between the signal beam of the measuring beam and the signal beam of the correcting beam.

Figure 3:
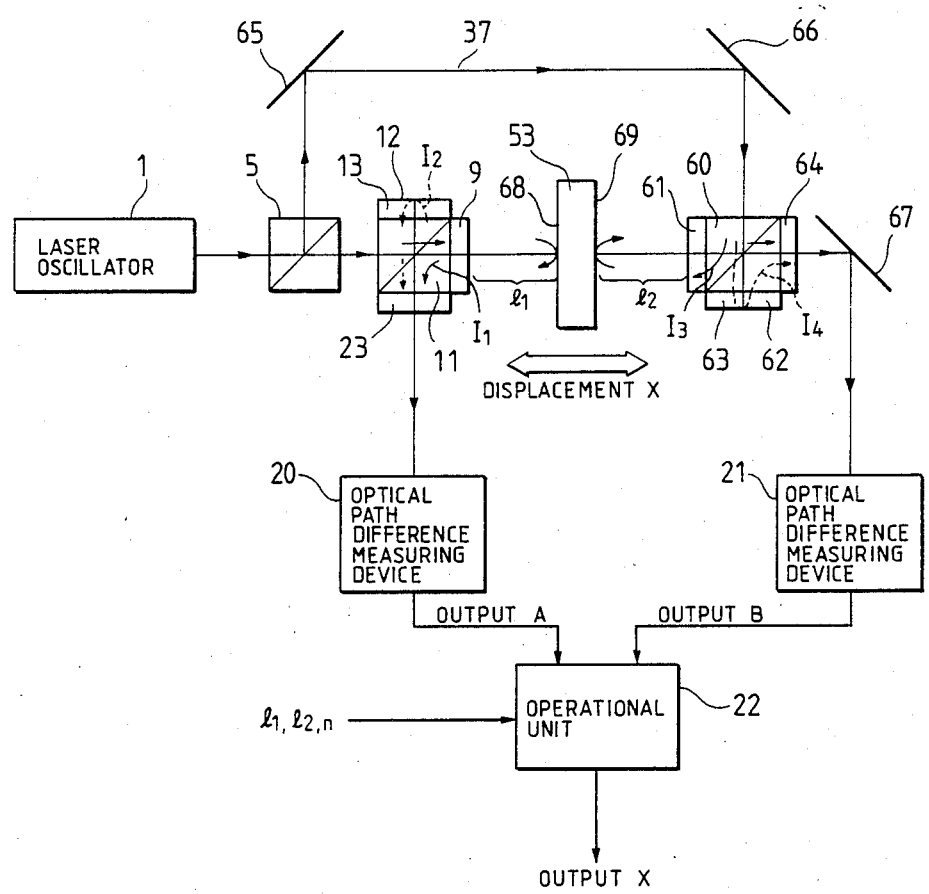
FIG. 3 is a block diagram showing the construction of an embodiment of the present invention.

Next, the laser gauge interferometer in accordance with another embodiment of the present invention will be explained with reference to FIG. 3. In this drawing, like reference numerals are used to identify like constituents as in FIG. 1. Reference numeral 1 denotes a laser oscillator for oscillating linearly polarized beam and B.S. 5 is means for dividing the laser beam to the measuring beam and the correcting beam. The measuring beam is led to the measuring beam 37 interferometer and the correcting beam is led to the correcting beam interferometer by mirrors 65 and 66. The correcting beam interferometer consists of P.B.S. 11, the ¼ wavelength plates 9, 13 and the polarization plate 23 in the same way as in the foregoing embodiment. The correcting beam interferometer, too, consists of P.B.S. 60, the ¼ wavelength plates 61, 62, reflection film 63 and the polarization plate 64 in exactly the same way as in the foregoing embodiment. In this embodiment the measuring beam measures the displacement of the reflection surface 68 of the rod mirror 53 fitted to the object of measurement by use of the former interferometer as the reference and the correcting beam measures the displacement of the reflection surface 69 on the back of the rod mirror 53 from the opposite side to the above by use of the latter interferometer as the reference. The behavior of the laser beam in each interferometer and the outline of interference are exactly the same as in the foregoing embodiment and their detailed explanation will be omitted. The interference beam from the measuring interferometer is processed by the optical path difference measuring device 20 to obtain the output A converted to the displacement x and the interference beam from the correcting beam interferometer is processed by the optical path difference measuring device 21 to obtain the output B converted to the displacement x. The output A, B containing the influences of the change of the refractive index of air are further inputted to the operational unit 22 with $l_1$, $l_2$ and n and calculation for eliminating the change component of the refractive index is carried out to obtain the measurement output X representing the displacement x free from the influence of the change of the refractive index.

Each of these outputs will be described definitely. At the origin of measurement (at the time of reset) or when the displacement x of the rod mirror 53 is zero, the distance between the reflecting surface 68 and the ¼ wavelength plate 9 and the distance between the reflecting surface 69 and the ¼ wavelength plate 61 are expressed by $l_1$ and $l_2$ respectively. Furthermore, the refractive index of air is assumed to be uniform and n in the regions of $l_1$ and $l_2$. Assuming that the rod mirror 53 undergoes displacement by x from this state and the refractive index of air changes uniformly by $\Delta x$, then the outputs A and B of the optical path difference measuring devices 20 and 21 are given as follows, respectively:

$$A = (l_1 + x)(n + \Delta n) - l_1 n$$
$$= x(n + \Delta n) + l_1 \Delta n \quad (4)$$

$$B = (l_2 - x)(n + \Delta n) - l_2 n$$
$$= -x(n + \Delta n) + l_2 \Delta n \quad (5)$$

From (4) and (5), $$A + B = (l_1 + l_2) \Delta n$$

Therefore,
$$\Delta n = A + B / l_1 + l_2$$

On the other hand, from (4) and (5) similarly, $$A - B = 2 \times (n + \Delta n) - (l_1 - l_2) \Delta n \quad (6)$$

Accordingly, $$x = \frac{(A - B) + (l_1 - l_2)\Delta n}{2(n + \Delta n)} \quad (7)$$

When (6) is put into (7) and arranged in terms of x, $$x = \frac{l_1 A - l_2 B}{n(l_1 + l_2) + (A + B)} \quad (8)$$

Therefore, if $l_1$, $l_2$ and n at the time of reset are inputted to the operational unit as the initial values, the calculation of equation (8) is made by inputting the outputs A, B of the optical path difference measuring devices 20, 21, whenever necessary, and the solution x is outputted as the output X, whenever necessary, this output X provides the result of measurement of the stable displacement x free from the change of the refractive index $\Delta n$ of air, that is, the influence of fluctuation of air.

Next, the laser gauge interferometer in accordance with still another embodiment of the present invention will be described with reference to FIG. 4. Like reference numerals are used to identify like constituents as in the foregoing drawings. First of all, the overall construction will be explained. Reference numeral 1 denotes the wavelength stabilization laser oscillator for oscillating the linearly polarized beam is fed to polarization plane preservation fiber 12 which guides the laser beam to the interferometer 3 while keeping the polarization state. The interferometer 3, which undergoes displacement on a base to the right and left relative to the base, not shown, consists of B.S. 5 which has the polarization plate 4 bonded thereto and whose one corner is fabricated as an optically polished plane 52 parallel to the split plane 51, P.B.S. 6 prepared by bonding the ¼ wavelength plate 7 having the reflection film 8 to the polarization plate 23, and P.B.S. 11 prepared by bonding the ¼ wavelength plate 9 having the reflection film 10, the ¼ wavelength plate 13 having the reflection film 12 and the ¼ wavelength plate 14. Reference numerals 15 and 16 denotes mirrors which are connected to each other by a support member 17 made of a material having a small linear expansion coefficient such as superamber and this support member 17 is fixed to the base (not shown) described above. Reference numerals 18 and 19 denote multi-mode fibers. The multi-mode fiber 18 guides the interference beam between the signal beam $I_1$ and the reference beam $I_2$ to the optical path difference measuring device 20 and the multi-mode fiber 19 guides the interference beam between the signal beam $I_3$ and the reference beam $I_4$ to the optical path difference measuring device 21. The outputs of these optical path difference measuring devices 20 and 21 are the outputs A and B, respectively. Reference numeral 22 denotes an operational unit for processing these outputs, and the output of the operational unit is the output X.

Next, the operation will be described. The linearly polarized beam from the laser oscillator 1 is guided to the interferometer 3 while its polarization state is kept as such by the polarization plane preservation fiber 2. The angle of this fiber is set so that the direction of polarization is at 45° to the sheet of drawing at the outlet of the fiber 4. Accordingly, the polarization components other than 45° are cut off on the polarization plate 4 having the axis of transmission in the direction at 45° to the sheet of drawing. The linearly polarized beam having the plane of polarization in the direction at 45° to the sheet of drawing and passing through the polarization plate 4 is split on the split plane 51 of B.S. 5. Among them, the beam that first passes through B.S. 5 is as such reflected and the reflected beam is again reflected on the optically polished surface 52. Then, they are incident to P.B.S. 6 in parallel with each other. Among these incident beams to P.B.S. 6, the former measuring beam is split into the linearly polarized beam $I_1$ having the plane of polarization perpendicularly to the sheet of drawing and the linearly polarized beam $I_2$ having the plane of polarization parallel to the sheet of drawing on P.B.S. 6 and they become the measuring beams ($I_1$ being the signal beam of the measuring beam and $I_2$ being the reference beam of the measuring beam). Similarly, the latter correcting beam is split to the linearly polarized beam $I_3$ having the plane of polarization perpendicular to the sheet of drawing and the linearly polarized beam $I_4$ having the plane of polarization parallel to the sheet of drawing and they become the correcting beams ($I_3$ being the signal beam of the correcting beam and $I_4$ being the reference beam of the correcting beam).

Since this embodiment is a little more complicated than the foregoing embodiments, the beams $I_1$ and $I_2$ will be explained first. The beam $I_1$ reflected by P.B.S. 6 is further reflected by P.B.S. 11, passes through the ¼ wavelength plate 14, is again reflected by the mirror 15, then passes again the ¼ wavelength plate 14 and returns to P.B.S. 11. Since the plane of polarization is turned by 90°, the beam thus going once to and from the ¼ wavelength plate passes and reaches ¼ wavelength plate 9 this time, is reflected by the reflection film 10 on its back and reaches thrice P.B.S. 11. Furthermore, the beam whose plane of polarization is turned by 90° is reflected by P.B.S. 11, goes to and from the ¼ wavelength plate 13 and reaches the polarization plate 23 through P.B.S. 11 and P.B.S. 6. On the other hand, the beam $I_2$ that has first passes through P.B.S. 6 passes through the ¼ wavelength plate 7, is reflected by the reflection film 8 on its back and returns to P.B.S. 6 by passing again through the ¼ wavelength plate 7. The beam whose plane of polarization is rotated by 90° after going once to and from the ¼ wavelength plate is reflected this time by P.B.S. 6 and reaches the polarization plate 23. These beams $I_1$ and $I_2$ that overlap with each other when they are incident to the polarization plate 23 do not interfere with each other because their planes of polarization cross each other orthogonally, but their common components cause mutual interference on the polarization plate 23 having the axis of transmission in the direction at 45° to the sheet of sheet of drawing, and the intensity of the interference beam changes sinusoidally in accordance with the difference of the optical path lengths of these beams. This interference beam is guided by the multi-mode fiber 18 to the optical path difference measuring device 20 and the change component of the difference of the optical path lengths of both beams $I_1$ and $I_2$ is obtained as the output A.

Next, the beams $I_3$ and $I_4$ will be described. The beam $I_3$ reflected by P.B.S. 6 is further reflected by P.B.S. 11, goes once to and rom the mirrors 15 and 16, is reflected by the reflection film 12 fitted to the back of the ¼ wavelength plate 13 and reaches the polarization plate 23 through P.B.S. 11 and P.B.S. 6. On the other hand, after transmitting through P.B.S. 6, the beam $I_4$ is reflected by the reflection film 8 on the back of the ¼ wavelength plate 7 and reaches the polarization plate 23 again through P.B.S. 6. In the same way as described above, the beams $I_3$ and $I_4$ interfere with each other on the polarization plate 23 and this interference beam is guided by the multi-mode fiber 19 to the optical path difference measuring device 21 so that the change component of the difference of the optical path lengths of these beams $I_3$ and $I_4$ is outputted as the output B.

Subsequently, the optical path length of each of these beams $I_1$ to $I_4$ will be explained. It will be assumed hereby that at the origin of the measurement (at the time of reset) or when the displacement x of the interferometer 3 is zero, the distance between the mirror 15 and the ¼ wavelength plate 14 is $l_1$, the distance between the ¼ wavelength plate 9 and the mirror 16 is $l_2$ and the refractive index of air is uniform and n in the regions of $l_1$ and $l_2$. In the optical path inside each optical element of the interferometer 3, no influence of the fluctuation of air is exerted and its optical path length is stable. Therefore, the following description will consider only the optical path length which is affected by the fluctuation of air.

First of all, the optical path lengths of the beams $I_1$ and $I_2$ at the time of reset are as follows:
at the time of reset:
optical path length of $I_1 = 2l_1 n$
optical path length of $I_2 = 0$
Therefore, the difference of the optical path length between them is $2l_1 n$. Next, it will be assumed that the interferometer undergoes displacement by x to the right from this state and in the interim, the refractive index of air changes uniformly by $\Delta n$ to $(n+\Delta n)$. Then, after displacement x:
optical path length of $I_1 = 2(l_1 + x)(n + \Delta n)$
optical path length of $I_2 = 0$
Therefore, the difference of their optical path lengths becomes $2(l_1 + x)(n + \Delta n)$, and the output A of the optical path difference measuring device 20 is as follows:

$$A = 2(l_1 + x)(n + \Delta n) - 2l_1 n$$

$$= 2x(n + \Delta n) + 2l_1 \Delta n \qquad (9)$$

On the other hand, the optical path length of each of the beams $I_3$ and $I_4$ at the time of reset is as follows:
at the time of reset:
optical path length of $I_3 = 2(l_1 + l_2)n$
optical path length of $I_4 = 0$
Therefore, the difference of the optical path lengths between them at the time of reset is $2(l_1 + l_2)n$. Next, after the interferometer 3 undergoes displacement by x, after diaplacement x:
optical path length of $I_3 = 2(l_1 + x)(n + \Delta n) + 2(l_2 - x)(n + \Delta n)$
optical path length of $I_4 = 0$
Since the difference of their optical path lengths is $2(l_1 + x)(n + \Delta n) + 2(l_2 - x)(n + \Delta n)$, the output B of the optical path difference measuring device 21 is given as follows:

$$B = 2(l_1 + x)(n + \Delta n) + 2(l_2 - xl)(n + \Delta n) - 2(l_1 + l_2)n$$

$$= 2(l_1 + l_2)\Delta n \qquad (10)$$

When $\Delta n = B/2(l_1 + l_2)$ obtained from equation (10) is put into equation (9) and the equation is put in order, $$A = 2x\left(n + \frac{B}{2(l_1 + l_2)}\right) + \frac{l_1}{l_1 + l_2} B$$

When the equation above is solved for x, $$x = \frac{(l_1 + l_2)A - l_1 B}{2n(l_1 + l_2) + B} \qquad (11)$$

Therefore, if $l_1$, $l_2$ and n at the time of reset are inputted to the operational unit 22 as the initial values, the equation (11) is calculated by inputting the outputs A and B of the optical path difference measuring devices 20 and 21 to the operational unit 22, whenever necessary, and it solution x is outputted as the output x, whenever necessary, the output x is the result of measurement of the stable displacement x which is not affected by the change of refractive index $\Delta n$ of air, that is, the influence of the fluctuation of air.

Next, accuracy required for $l_1$, $l_2$ and n at the time of reset that are used as the initial values will be examined.

First of all, if $l_1$ has an error $\Delta l_1$, the measurement error resulting from this error is given as follows:

$$\Delta x = \frac{(l_1 + l_2 + \Delta l_1)A - (l_1 + \Delta l_1)B}{2n(l_1 + l_2 + \Delta l_1) + B} - \frac{(l_1 + l_2)A - l_1 B}{2n(l_1 + l_2) + B}$$

$$\approx \frac{B \Delta l_1 (A - 2nl_2)}{\{2n(l_1 + l_2) + B\}^2}$$

Here, since $n \approx 1 B << 2n(l_1+l_2)$, $B = 2\Delta n(l_1+l_2)$ the following relation is established:

$$\Delta x \approx \frac{2\Delta n \Delta l_1(A - 2l_2)}{(l_1 + l_2)}$$

Here, since $2(A+2l_2)$ and $(l_1+l_2)$ are in the same order, if it will be assumed that at least $$\frac{2(A - 2l_2)}{(l_1 + l_2)} < 10$$

and $\Delta n \approx 10^{-6}$ when the temperature changes by 1° C. on the optical path of 1 m of go-and-return, assuming that $$\frac{2(A - 2l_2)}{(l_1 + l_2)} < 10, \Delta n \approx 10^{-6},$$

then,
$$\Delta x \approx 10 \times 10^{-6} \Delta l_1$$

In order to measure the measurement value x with an error of 1 nm, $$10 \times 10^{-6} \Delta l_1 < 10^{-9}$$

$$\therefore \Delta l_1 < 10^{-4} \, (m)$$

Next, when $l_2$ has an error $\Delta l_2$, the measurement error resulting from this error is as follows:

$$\Delta x = \frac{A(l_1 + l_2 + \Delta l_1) - l_1 B}{2n(l_1 + l_2 + \Delta l_2) + B} - \frac{A(l_1 + l_2) - l_1 B}{2n(l_1 + l_2) + B}$$

$$\approx \frac{B\Delta l_2(A - 2nl_1)}{\{2n(l_1 + l_2) + B\}^2}$$

This formula has the same form as $\Delta l_1$ described above and the allowance of $\Delta l_2$ is also $\Delta l_2 < 10^{-4}$ (m).

Finally, when n has an error $\delta n$, the measurement error resulting from this error is as follows:

$$\Delta x = \frac{(l_1 + l_2)A - l_1 B}{2n(n + \delta n)(l_1 + l_2) + B} - \frac{(l_1 + l_2)A - l_1 B}{2n(l_1 + l_2) + B}$$

$$= \frac{-2\delta n(l_1 + l_2)\{(l_1 + l_2)A - l_1 B\}}{\{2(n + \delta n)(l_1 + l_2) + B\}\{2n(l_1 + l_2) + B\}}$$

$$\approx -2A \cdot \delta n$$

Therefore, in order for $\Delta x$ to have accuracy of 1 nm ($10^{-9}$ m), n must have accuracy of as severe as $10^{-8}$ to $10^{-9}$.

As described above, in this case, too, the error of n is as such reflected on the measurement error of the displacement x in the same way as in the first embodiment and affects the absolute accuracy, but since repetition accuracy in guaranteed, it provides a suitable effect in the following embodiment.

Figure 4:
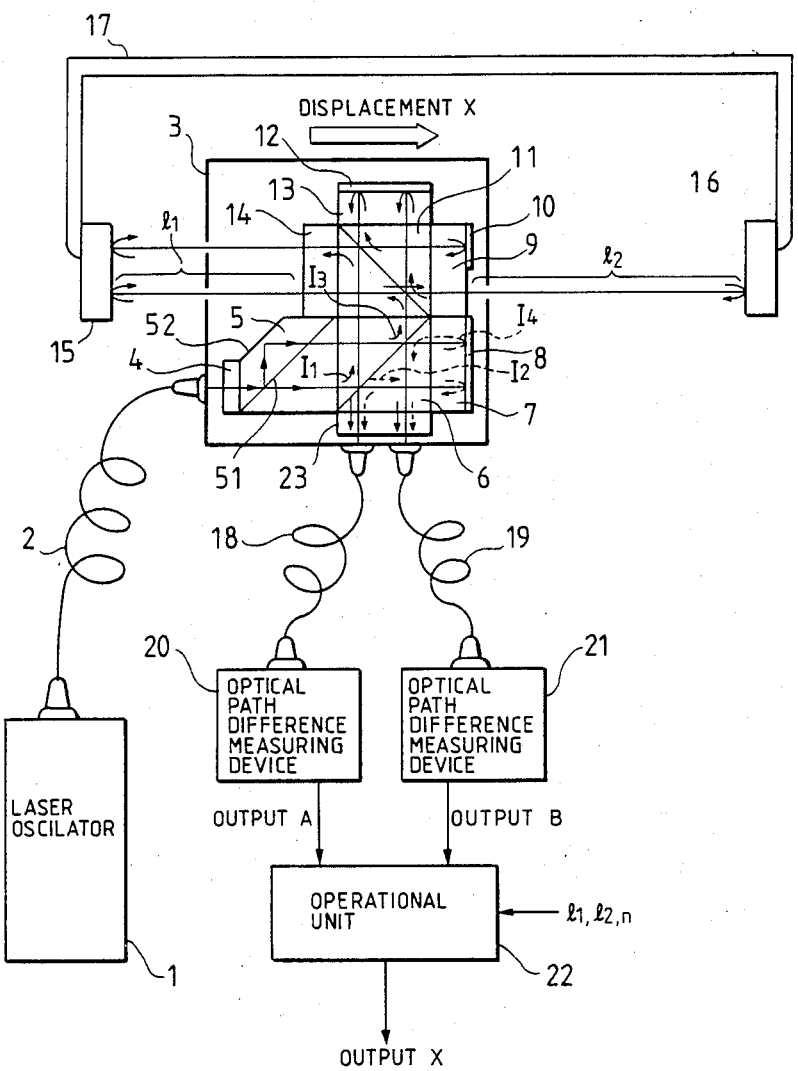
FIG. 4 is a plan view of another embodiment of the present invention.
Figure 5:
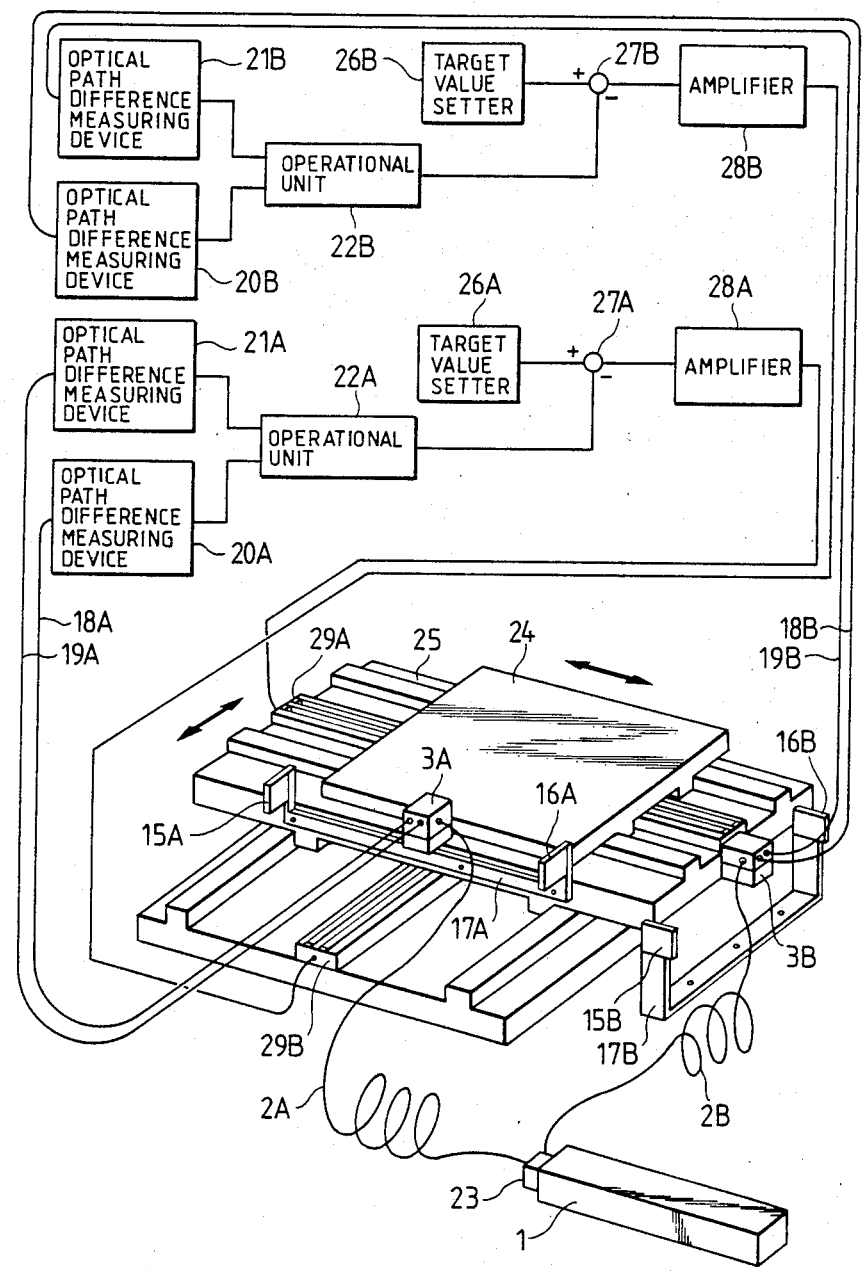
FIG. 5 is a combined perspective view of an X-Y stage locating apparatus and functional block circuitry employed therewith, with respect to the laser gauge interferometer shown in FIG. 4.

The present invention will now be described in more detail with reference to FIG. 5, wherein the laser gauge interferometer shown in FIG. 4 is used as a sensor for locating an X-Y stage, and like reference numerals are used to identify like constituents (however, with suffixes A, B) as in the foregoing drawings. It is of course possible to constitute such a stage system by use of the laser gauge interferometer shown in FIGS. 1 and 3 and the outline is also the same.

First of all, the overall construction will be explained. Reference numeral 1 denotes a laser oscillator and 23 denotes a B.S. for splitting the laser beam to a locating beam for locating an upper table 24 of an X-Y stage and a locating beam for locating its lower table 25. Reference numerals 2A and 2B denote polarization plane reservation fibers for guiding these beams to interferometer 3A and 3B, respectively. The interferometer 3A is the one for locating the upper table 24 and is disposed on the upper table 24. Reference numerals 15A and 16A represent reference mirrors for the interferometer 3A, which are fixed to the lower table 25 through a support member 17A. On the other hand, reference numeral 3B denotes an interferometer for locating the lower table, and its disposed on the lower table 25. Reference numerals 15B and 16B denote reference mirrors for the interferometer 3B and they are fixed to a base, on which the stage is disposed, through a support member 17B. Reference numerals 18A, 19A, 18B and 19B denote multi-mode fibers for guiding the interference beams and reference numerals 20A, 21A, 20B and 21B are respective optical path difference measuring devices. Reference numeral 22A represents an operational circuit for calculating the displacement of the upper table 24; 26A is a target value setter of the upper table 24; 27A is a comparator; 28A is an amplifier; and 29A is a linear motor for driving the upper table 24. Reference numerals 26B to 29B denote those components for the lower table 25 which are the same as those of the upper table.

Next, the operation will be explained. The linearly polarized beam from the laser oscillator 1 is split to the beam for locating the upper table 24 and the beam for locating the lower table 25 by B.S. 23. The beam for locating the upper table 24 is guided to the interferometer 3A through the polarization plane preservation fiber 2A. The interferometer 3A has the same structure as that of FIG. 4. In the same away as in the foregoing description, the interferometer 3A moves with the upper table 24 between the two mirrors 15A and 16A fixed to the lower table 25 through the support member 17A, the interference beams 18A, 19A are converted to the difference of the optical path lengths by the optical path difference measuring devices 20A, 21A and the displacement x is determined by the operational unit 22A. The displacement quantity thus determined is compared with the output of the target value setter 26A by the comparator 27A and the upper table 24 is subjected to servo-control by the amplifier 28A and the linear motor 29A so that the difference between them becomes zero.

Locating is also made for the lower table 25 by exactly the same mechanism.

As described already, in order for the displacement x to have the absolute accuracy of $10^{-9}$ m, the initial value of the refractive index n at the time of reset must be measured in the order of $10^{-8}$. One of such methods measures the temperature, pressure and humidify of air and determines n by a numerical formula but in order to measure n in the order of $10^{-8}$, measurement must be made at a temperature of 0.01° C., pressure of 0.025 mmHg (0.03 mb) and humidify of 0.2 mmHg. This is not practical.

Figure 6:
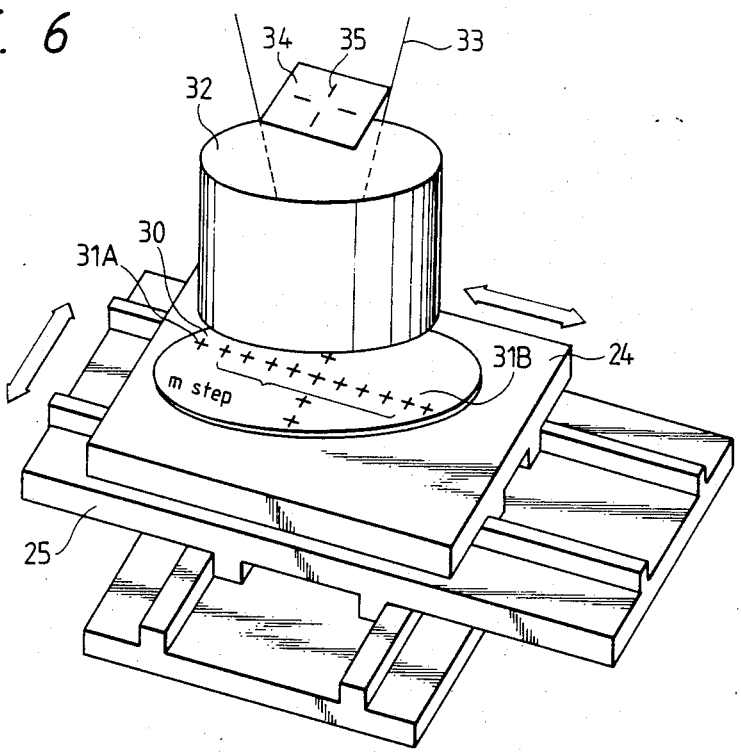
FIG. 6 is a perspective view of a portion of the interferometer apparatus for explaining the method of calibrating the laser gauge interferometer in the locating apparatus shown in the preceding figures.

Therefore, n is determined by the following method to calibrate the measuring apparatus. One example will be explained briefly with reference to FIG. 6. FIG. 6 is an explanatory view showing the mode of locating practically a wafer by the X-Y stage system controlled by the laser gauge interferometer of the present invention. The X-Y stage shown in FIG. 5 relies on the system shown in FIG. 5 and like reference numerals are used to identify like constituents. Since the laser gauge interferometer and the driving mechanism of the stage are shown in detail in FIG. 5, they are omitted from FIG. 6. In this drawing, reference numeral 30 denotes a reference wafer equipped with alignment marks 31A, 31B, etc. having a known reference step gap. Reference numeral 32 denotes a scale-down projection optical system and 34 denotes a mask equipped with alignment marks 35. The scale-down projection optical system 32, the mask 34 and an exposure light source (not shown) for emitting exposure beam 33 are fixed and held on the base, on which the stage is mounted, by a structure called a "column". Alignment of the wafer with the scale-down projection optical system 32 is made when the X-Y stage having the wafer mounted thereto moves.

To calibrate the laser gauge interferometer for measuring the upper table 24, for example, the upper table 24 is first located in such a manner as to align the alignment mark 31A with the alignment mark 35. Pattern detection technique is generally employed for this alignment, whereby the mode of overlap of the alignment marks 31A and 35 is observed by a television camera and the alignment position is detected by image processing. The laser gauge interferometer is reset at this instant, and the value 1.0, for example, is put as the approximate value of the initial value of n. Next, alignment is made for the alignment mark 31B spaced apart by a known distance $x_o$ (m step) by moving the upper table 24. At this time the output A of the optical path difference measuring device 20B of the laser gauge interferometer is expected to exhibit a value which is extremely approximate to $x_o$, but an error occurs because the initial value of n is set previously to the approximate value 1.0. Here, if the n value determined by the following equation is again inputted as the correct initial value, the scale of the laser gauge interferometer comes to be calibrated by the alignment marks 31A and 31B of the reference wafer 30:

$$n = \frac{(l_1 + l_2)A - l_1B - x_oB}{2x_o(l_1 + l_2)}$$

Thereafter a correct and stable measurement value can be outputted by correcting every moment the change of the refractive index n of air until the power source is cut off or reset is made once again.

The laser gauge interferometer for measuring the lower table 25 can be calibrated, too, by the similar means.

According to the method described above, the wafer can be located in the correct pitch irrespective of the change of the refractive index of air and moreover, fine oscillation due to the change of n does not occur at the stop position. Furthermore, since reproducibility of measurement is high, high superposition accuracy can be obtained when a pattern is formed in a multi-layered structure on the wafer and locating of the water can be made in a satisfactory manner.

Since locating accuracy of the stage is high, the operation of chip alignment by pattern detection or the like for each exposure step of IC, that has been necessary in the past, can be now be eliminated and global alignment of aligning only once the mask and the wafer on an average whenever the wafer is exchanged will suffice the necessity so that throughput, too, can be improved drastically.

In this embodiment, the following method can be employed, too, without preparing particularly the reference wafer.

To form a multi-layered pattern on the wafer, the initial value of n to be inputted as a constant to the laser gauge interferometer is set, for example, to n=1.0 when the first layer pattern is baked, and the first layer pattern is thus baked. In practice, the initial value n of the refractive index of air has an error to the value 1.0 set tentatively, but the degree of error is at most above $3 \times 10^{-4}$. This is the error of $10^{-2}$ mm with respect to an ordinary chip gap 15 mm and does not render any problem in practice. As described already, this error appears in the same way for all the chips and the chip gap can be kept accurate. After the first layer is thus baked, the alignment mark is put for each chip. Therefore, high alignment accuracy can be obtained by calibrating the laser gauge interferometer to the alignment mark of the first layer when the second layer and so forth are baked.

Figure 7:
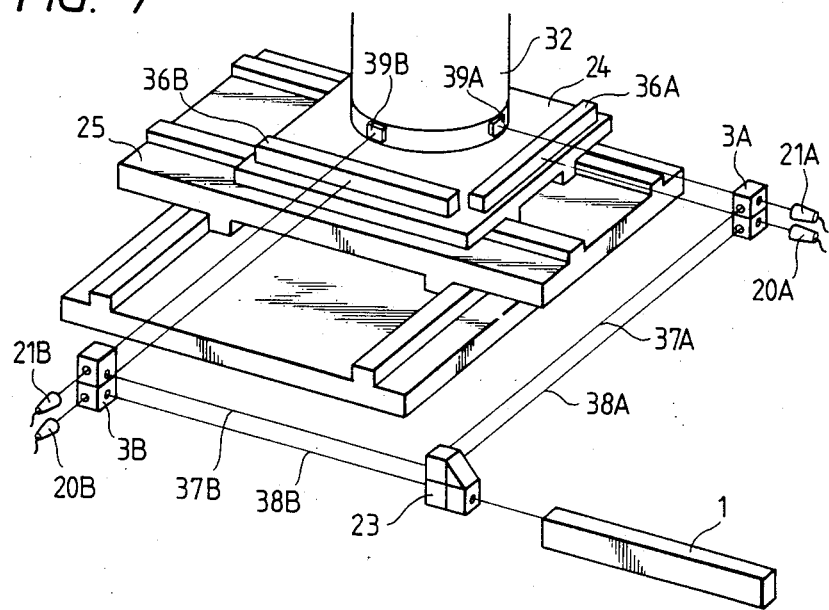
FIG. 7 is a top perspective view of a modification of the present invention.

Still another embodiment of the present invention will be explained with reference to FIG. 7. This embodiment has the structure closest to the prior art example (Japanese Patent Laid-Open No. 263801/1985). Like reference numerals are used to identify like constituents as in the foregoing drawings, and the X-Y stage driving mechanism and the column are omitted from the drawing in the same way as in FIG. 6.

The laser beam from the laser oscillator 1 is divided by the beam splitter 23, consisting of a plurality of beam splitters, into four beams, i.e., correction beam 37A and measuring beam 38A for locating the upper table 24 and the correcting beam 37B and measuring beam 38B for locating the lower table 25. Among them, the correction beam 37A and measuring beam 38A are incident to the interferometer 3A and the latter correcting beam 37B and measuring beam 38B are incident to the interferometer 3B. The interferometers 3A and 3B are fixed to the base on which the X-Y stage consisting of the upper table 24 and the lower table 25 is disposed.

The measuring beam 38A incident to the interferometer 3A is split into the two beams $I_1$ and $I_2$ in the same way as described above. The beam $I_1$ is projected to the rod mirror 36A disposed on the upper table 24, is reflected by this mirror 36A, then returns to the interferometer 3A and interferes with the beam $I_2$ in the same way as described already. Receiving this interference beam, the optical path difference measuring device 20A generates an output (inclusive of the influence of the change of the refractive index of air) representing the displacement of the upper table 24.

The correcting beam 38A incident to the interferometer 38A is likewise split into the two beams $I_3$ and $I_4$. The beam $I_3$ is projected to the correcting beam reference mirror 39A fixed to the scale-down projection optical system 32 fixed to the column, is reflected by this mirror 39A and interferes with the beam $I_4$. Receiving this interference beam, the output of the optical path difference measuring device 21A generates the output (inclusive of the influence of the change of the refractive index of air) representing the displacement of the reference mirror 39A to the base. Since this reference mirror 39A is originally and practically unmovable to the base, the output of the optical path difference measuring apparatus 21A represents only the influence of the change of the refractive index of air. (Therefore, the position of disposition of the reference mirror 39A is not limited to the position described above but may be disposed at any position so long as it is fixed to the base.)

If the calculation for correcting the change of the refractive index $\Delta n$ of air is made by use of the outputs of the optical path difference measuring devices 20A and 21A by the operational unit, the result of measurement of displacement of the upper table which is table and free from the influence of the change of the refractive index of air can be obtained.

Incidentally, the actions of the correcting beam 37A and measuring beam 38B for locating the lower table 25 are exactly the same as those for locating the upper table 24.

In the gauge interferometer utilizing the laser interference, the present invention can correct the measurement error of the displacement due to the change of the refractive index of air and can provide a stable output having high accuracy and high reproducibility at whichever position the object of measurement is situated, in whichever way the refractive index of air is distributed on the beam and even when the refractive index changes non-uniformly.

While preferred embodiments along with variations and modifications have been set forth for disclosing the best mode and important details, further embodiments, variations and modifications are contemplated according to the broader aspects of the present invention, all as set forth in the spirit and scope of the following claims.

What is claimed:

1. A laser gauge interferometer utilizing interference of laser beams, said laser gauge interferometer apparatus comprising:

means for splitting a laser beam into two laser beams, namely a correcting beam and a measuring beam;

first interferometer means for generating a measurement output representing the quantity of displacement of an object of measurement by use of said measuring beam passing through air independently of said correcting beam;

second interferometer means for generating, independently of said measuring beam, a measurement output affected by the change of refractive index of air, different from the output of said first interferometer means and by use of said correcting beam passing through air in proximity to said measuring beam; and operational means responsive to said measurement outputs, a reference fixed signal representing a reference refractive index of air and a reference signal representative of a starting location for said object, for outputting the result of measurement representing the corrected quantity of displacement of the object of measurement free from the influence of change of the refractive index of air.

2. A laser gauge interferometer according to claim 1, further including means fixing the optical path lengths of both of said beams in air so that they vary according to movement of the object of measurement relative to said interferometer means.

3. A laser gauge interferometer according to claim 1, wherein said first and second interferometer means are separate from each other and respectively positioned on opposite sides of said object of measurement.

4. A laser gauge interferometer according to claim 1, wherein said interferometer means establishes separate paths of travel of said measuring beam and said correcting beam in air between said interferometer means and the object of measurement such that said paths correspondingly vary with movement of said object of the measurement and differ from each other by a fixed substantial length.

5. A laser gauge interferometer according to claim 1, wherein said interferometer means has a solid/air interface surface through which said measuring and correcting beams radiate toward the object of measurement; and abutment surface means providing positive contact between a surface of said interferometer means and a fixed reference surface that is coplanar with said solid/air interface surface and perpendicular to the paths of said measuring and correcting beams.

6. A laser gauge interferometer according to claim 1, further including motor means for moving the object of measurement along the direction of said paths and providing a positional feedback signal; means comparing said positional feedback signal with said object positional output signal and producing a correction signal for energizing said motor means.

7. A method of determining positional information using a laser gauge interferometer utilizing interference of laser beams, said method comprising:

providing a plurality of alignment marks on an object of measurement spaced apart a known accurate distance from one another;

splitting a laser beam into two laser beams, namely a correcting beam and a measuring beam;

generating a first interferometer measurement output representing the positional information of one of said alignment marks by use of said measuring beam passing through air independently of said correcting beam;

generating independently of said measuring beam, a second interferometer measurement output representing positional information of the one of said alignment marks by use of said correcting beam passing through air in proximity to said measuring beam;

combining said measurement outputs and outputting the result of measurement representing the corrected quantity of position of the one alignment mark free from the influence of change of the refractive index of air;

comparing the difference between said results of measurement and the known distance between the one and second alignment marks for producing a reference refractive index of air for calibration of the laser gauge interferometer;

storing said reference refractive index of air as a constant;

repeating said steps of splitting generating, combining and outputting with respect to an object of measurement without alignment marks, with said steps of combining and outputting being responsive to said stored fixed reference index or refractive index of air to produce an object positional output signal;

moving the object of measurement along the direction of said paths and providing a positional feedback signal; and comparing said positional feedback signal with said object positional output signal and producing a correction signal for controlling said moving.

8. A laser interferometer, comprising:
   interferometer means for splitting a laser beam into a measuring beam and a correcting beam;
   said laser interferometer means having a solid/air interface surface for passing the measuring beam between transmission in a solid within the interferometer means and transmission along a path passing through air between the interferometer means and an object of measurement;
   said interferometer means having a solid abutment surface rigidly interconnected with the solid and having a reference abutment surface point generally located adjacent to the point where the measuring beam passes through said solid/air interface surface;
   said surfaces being oriented such that a line drawn through said points intersects the path through the air at about 90 degrees;
   a rigid mounting base having a rigid solid reference face directly engaging said reference abutment surface point of said interferometer means for positively preventing movement of said interferometer means along the path in one direction toward said base face and providing lost motion between said interferometer means and said base in the opposite direction; and
   means biasing said interferometer means in said one direction relative to said base for fixing one end of the air path independently of thermal expansion of said interferometer means.

9. The apparatus according to claim 8, wherein said interferometer means emits the measuring beam through said solid/air surface and receives the reflective measuring beam through said solid/air surface; and said solid/air surface extends planar and perpendicular to the air path.

10. A laser gauge interferometer using interference of laser beams, comprising:
   means for splitting a laser beam into a correcting beam and a separate measuring beam;
   means for splitting each of said measuring beam and said correcting beam into a reference beam and a measurement beam;
   means for passing each of said reference beams along a reference optical path of fixed known length and fixed optical properties;
   means for passing each of said measurement beams along a gas optical path of unknown measurement length having optical-properties that change with environmental characteristics, with the paths of said measurement beams being at least adjacent each other for generally subjecting them to the same changing optical properties;
   said interferometer means establishing an interference pattern between said reference beam and said measurement beam for each of said measuring beam and correcting beam;
   optical path measuring means for converting the interference pattern for said measuring beam and or said directing beam respectively, to produce measuring and correcting output signals correlated to the length of said gas optical path;
   operational means for combining said measuring and correcting output signals to thereby cancel measurement errors due to changing optical properties of said gas optical path and producing an object positional output signal correlated to the length of said gas optical path that is independent of changing optical properties;
   reflecting means for reflecting the measurement beam of each of said measuring beam and said correcting beam at the end of their respective gas optical paths opposite from said interferometer means;
   one of said reflecting means and interferometer means being fixed relative to the object and the other of said reflecting means and interferometer means being fixed at a reference position; and
   said reflecting means and interferometer means establishing closely adjacent parallel gas optical paths for said measurement beams of each of said measuring beam and correcting beam with said gas optical paths having a fixed substantial difference in length independent of the relative movement between said object and said reference position.

11. The apparatus of claim 10, wherein said reflecting means comprises two reflecting mirrors spaced apart said fixed substantial distance for respectively reflecting the measurement beams of said measuring beam and correcting beam.

12. A laser gauge interferometer using interference of laser beams, comprising:
   means for splitting a laser beam into a correcting beam and a separate measuring beam;
   means for splitting each of said measuring beam and said correcting beam into a reference beam and a measurement beam;
   means for passing each of said reference beams along a reference optical path of fixed known length and fixed optical properties;
   means for passing each of said measurement beams along a gas optical path of unknown measurement length having optical-properties that change with environmental characteristics, with the paths of said measurement beams being at least adjacent each other for generally subjecting them to the same changing optical properties;
   said interferometer means establishing an interference pattern between said reference beam and said measurement beam for each of said measuring beam and correcting beam;
   optical path measuring means for converting the interference pattern for said measuring beam and for said directing beam respectively, to produce measuring and correcting output signals correlated to the length of said gas optical path;
   operational means for combining said measuring and correcting output signals to thereby cancel measurement errors due to changing optical properties of said gas optical path and producing an object positional output signal correlated to the length of said gas optical path that is independent of changing optical properties; and
   said interferometer means comprises two separate interferometer means respectively for said measuring beam and said correcting beam for establishing respective measurement beams generally coaxial with each other and on opposite sides of the object whose position is being measured.

13. The apparatus according to claim 12, further including reflecting means for reflecting the measurement beam of each of said measuring beam and said correcting beam at the end of their respective gas optical paths opposite from said interferometer means; and
   one of said reflecting means and interferometer means being fixed relative to the object and the other of said reflecting means and interferometer means being fixed at a reference position.

14. The apparatus according to claim 13, wherein said reflecting means includes two oppositely facing reflective surfaces rigidly interconnected and respectively reflecting said measurement beams of said measuring beam and correcting beam.

15. A laser gauge interferometer using interference of laser beams, comprising:
means for splitting a laser beam into a correcting beam and a separate measuring beam;
means for splitting each of said measuring beam and said correcting beam into a reference beam and a measurement beam;
means for passing each of said reference beams along a reference optical path of fixed known length and fixed optical properties;
means for passing each of said measurement beams along a gas optical path of unknown measurement length having optical-properties that change with environmental characteristics, with the paths of said measurement beams being at least adjacent each other for generally subjecting them to the same changing optical properties;
said interferometer means establishing an interference pattern between said reference beam and said measurement beam for each of said measuring beam and correcting beam;
optical path measuring means for converting the interference pattern for said measuring beam and for said directing beam respectively, to produce measuring and correcting output signals correlated to the length of said gas optical path;
operational means for combining said measuring and correction output signals to thereby cancel measurement errors due to changing optical properties of said gas optical path and producing an object positional output signal correlated to the length of said gas optical path that is independent of changing optical properties; and
said operational means including means providing a reference refraction index value for the optical material of said gas optical path and providing a reference position value for an initial position for said object, and combining said reference position value and said reference refraction index value with said outputs of said optical path measuring means for producing an output signal correlated to the coordinate position of the object.

16. The apparatus according to claim 15, further including reflecting means for reflecting the measurement beam of each of said measuring beam and said correcting beam at the end of their respective gas optical paths opposite from said interferometer means; and
one of said reflecting means and interferometer means being fixed relative to the object of the other of said reflecting means and interferometer means being fixed at a reference position.

17. A laser gauge interferometer using interference of laser beans, comprising:
means for splitting a laser beam into a correcting beam and a separate measuring beam;
means for splitting each of said measuring beam and said correcting beam into a reference beam and a measurement beam;
means for passing each of said reference beams along a reference optical path of fixed known length and fixed optical properties;
means for passing each of said measurement beams along a gas optical path of unknown measurement length having optical-properties that change with environment characteristics, with the paths of said measurement beams being at least adjacent each other for generally subjecting them to the same changing optical properties;
said interferometer means establishing an interference pattern between said reference beam and said measurement beam for each of said measuring beam and correcting beam;
optical path measuring means for converting the interference pattern for said measuring beam and for said directing beam respectively, to produce measuring and correcting output signals correlated to the length of said gas optical path;
operational means for combining said measuring and correcting output signals to thereby cancel measurement errors due to changing optical properties of said gas optical path and producing an object positional output signal correlated to the length of said gas optical path that is independent of changing optical properties;
motor means for moving the object of measurement along the direction of said paths and providing a positional feedback signal; and
means comparing said positional feedback signal with said object positional output signal and producing a correction signal for energizing said motor means.

18. A laser gauge interferometer using interference of laser beams, comprising:
means for splitting a laser beam into a correcting beam and a separate measuring beam;
means for splitting each of said measuring beam and said correcting beam into a reference beam and a measurement beam;
means for passing each of said reference beams along a gas optical path of fixed known length and fixed optical properties;
means for passing each of said mesurement along a gas optical path of unknown measurement length having optical-properties that change with environmental characteristics, with the paths of said measurement beams being at least adjacent each other for generally subjecting them to the same changing optical properties;
said interferometer means establishing an interference pattern between said reference beam and said measurement beam for each of said measuring beam and correcting beam;
optical path measuring means for converting the interference pattern for said measuring beam and for said directing beam respectively, to produce measuring and correcting output signals correlated to the length of said gas optical path;
operational means for combining said measuring and correcting output signals to thereby cancel measurement errors due to changing optical properties of said gas optical path and producing an object positional output signal correlated to the length of said gas optical path that is independent of changing optical properties;
said interferometer means having a solid/air interface surface through which said measuring and correcting beams radiate toward the object of measurement; and
abutment surface means providing positive contact between a surface of said interferometer means and a fixed reference surface that is coplanar with said solid/air interface surface and perpendicular to the paths of said measuring and correcting means.

* * * * *